Patented Sept. 7, 1937

2,092,742

UNITED STATES PATENT OFFICE 2,092,742

EFFERVESCENT MILK OF MAGNESIA

Alfred W. Pauley, University City, Mo., assignor to Levering Laboratories, Inc., St. Louis, Mo., a corporation of Delaware No Drawing. Application March 20, 1937, Serial No. 132,089

5 Claims. (Cl. 167—56)

This invention relates to a new medicinal product hereinafter referred to as effervescent milk of magnesia.

As is well known, milk of magnesia is largely used commercially as an antacid in correcting hyperacidity of the stomach when taken in small doses and as a gentle purgative in larger doses. It is useful as an antacid and mild laxative in hyperacidity of the stomach whether due to excess of hydrochloric acid or gastric juice or fermentative dyspepsia. The product comprises an aqueous suspension of magnesium hydroxide, the U. S. P. grade containing not less than 7% and not more than 8½% of magnesium hydroxide. The milk of magnesia sold commercially is a white, opaque, viscous suspension which in use is subject to various disadvantages. In the first place, since 75% of the product is water, it displays a tendency when left standing to separate into layers with the solid matter at the bottom and the water above in a clear liquid. In this condition, which it readily assumes after a short time, the water tends to evaporate, thereby destroying the proper proportion between the water and solid content. Numerous other well known objections apply to this product. It is not palatable and leaves a very chalky after taste when taken according to the common directions. When taken in water as frequently instructed it requires vigorous stirring and usually a fair amount of residue is left in the bottom of the glass. The solution adheres to the glass container, which, apart from resulting in waste, makes it difficult to determine visibly the exact amount within the container. Commercial milk of magnesia must be stored at such temperatures and under such conditions as to avoid freezing.

Milk of magnesia has heretofore been prepared in the form of compressed tablets but the composition of these tablets is not such that they disperse of their own accord in water. Moreover, these tablets, apart from the fact that they do not freeze, are subject to many of the objections that apply to milk of magnesia in liquid form.

With the foregoing in mind, it is an object of the present invention to prepare milk of magnesia or magnesium hydroxide in a form in which it is entirely free from all of the objections enumerated. The product which forms the subject matter of the present invention can be transported or stored at low as well as high temperatures without freezing or otherwise deteriorating. It has a new and improved taste, may be distributed in solid form and will go instantaneously into dispersion when added to water without stirring or otherwise agitating the mixture. It has added antacid qualities and involves various economies in manufacture and distribution.

In accordance with the practice of the invention disclosed and claimed herein, milk of magnesia or magnesium hydroxide is rendered effervescent by means of the employment of a suitable process. When so prepared it may be distributed in granular form and a teaspoonful or a tablespoonful of the granular milk of magnesia will be at least the same as a teaspoonful or tablespoonful of liquid milk of magnesia. When added to water the effervescent action takes place instantly, resulting in a suspension that is far more palatable than any other form of milk of magnesia.

A desirable method of producing the new product is described in the following paragraphs, although it is to be understood that other methods of producing effervescence may be employed without departing from the scope of the invention as outlined herein and set forth in the appended claims.

Other objects of the invention will become apparent as the description proceeds.

In accordance with one practice of the invention, magnesium hydroxide in dry powdered form is mixed with a non-toxic foaming or effervescing agent, or a combination of foaming or effervescing agents and intimately brought together in granular or solid form in such a way that the resultant product when added to water will foam or effervesce with decomposition of the effervescing agent or agents and thorough dispersion of the magnesium hydroxide in the water. The foaming or effervescing agents preferably employed are sodium bicarbonate, tartaric acid and citric acid. In the presence of water, sodium bicarbonate reacts with the citric acid and the tartaric acid liberating carbon dioxide in each case. The combination of materials employed destroys the chalky taste, which is characteristic of milk of magnesia and produce a thoroughly dispersed palatable milk of magnesia suspension. This suspension as prepared in accordance with the preferred embodiments of this invention hereinafter described contains approximately twice the amount of magnesium hydroxide of the U. S. P. requirements for milk of magnesia. The reactions involved in producing the effervescence, however, do not destroy the composition of the magnesium hydroxide which is the active ingredient in U. S. P. milk of magnesia. In other words, the magnesium hydroxide remains substantially unchanged chemically, only a small portion going into solution and the major part remaining suspended.

In making the effervescent milk of magnesia in accordance with this invention, the citric acid employed should preferably be uneffloresced crystals and should be powdered just before using. The reason for this is that it is desirable to capture the water of crystallization for use in making the granulation. Sodium bicarbonate should be used in dry, powdered form. If kept in a cool, dry atmosphere, it will not require drying. The magnesium hydroxide and the tartaric acid should preferably be dried at a temperature of 100° to 110° C. or until they cease to lose weight, and then should be powdered and passed through a No. 60 sieve. It is important that the product be made and kept in a relatively dry atmosphere.

In preparing the product, the citric acid and other ingredients should be prepared as directed above. The magnesium hydroxide, sodium bicarbonate and tartaric acid are then mixed without trituration and the citric acid added last. The resulting product is then spread evenly, preferably not to exceed a depth of ten millimeters, on a sheet, belt or tray of paper, glass, porcelain or other suitable material, and placed in an oven heated to a temperature between 95° and 105° C.

The powder is allowed to remain in the oven without stirring until it becomes moist, due to the liberation of water of crystallization from the citric acid. After the product acquires the proper consistency, about the consistency of dough, it is then immediately forced or extruded through a No. 6 tinned iron sieve and dried at a temperature not to exceed 50° C. When it is dry, the granular product is passed through a No. 6 tinned iron sieve and transferred immediately to dry bottles or air tight containers which are sealed tightly before dispensing or marketing.

In the absence of facilities for the above manufacture, granulation can be accomplished on a water bath by transferring the powdered mixture prepared as above directed to a double-boiler heated by water actively boiling, the inner-dish being in direct contact with the water. When the pasty mass acquires proper consistency, as described in the previous process, it is immediately forced or extruded through a No. 6 tinned iron sieve and dried at a temperature not exceeding 50° C. The dry granules are then passed through a No. 6 tinned iron sieve and the product transferred to dry containers which should be then tightly sealed.

A preferred type of effervescent milk of magnesia prepared by the procedures described above is a dry, granular solid having the following approximate composition:

| | Parts |
|---|---|
| Magnesium hydroxide (Mg(OH)$_2$) | 22 |
| Sodium bicarbonate (NaHCO$_3$) | 50 |
| Citric acid (H$_3$C$_6$H$_5$O$_7$.H$_2$O) | 32 |
| Tartaric acid (H$_2$C$_4$H$_4$O$_6$) | 10 |

Effervescent milk of magnesia of this type when added to water effervesces and dissolves therein almost immediately, producing about 17.7% of its original weight in the form of suspended magnesium hydroxide, which is the active ingredient. Analysis of the product after it reacts in water indicates that nearly all of the magnesium hydroxide remains unchanged chemically. Only a small portion goes into solution, the major part remaining suspended. The amount of milk of magnesia formed in suspension by the effervescing action is about twice the U. S. P. requirements for magnesia magma or milk of magnesia. Therefore, when this product is used, the same antacid and laxative properties are exhibited as in the case of double the quantity of U. S. P. milk of magnesia. One average teaspoonful when added to water produces the quantity of magnesium hydroxide equal in amount to the magnesium hydroxide in two teaspoonfuls of U. S. P. milk of magnesia.

The reactions occurring upon dissolving the effervescent milk of magnesia may be represented by the following equations:

$$3NaHCO_3 + H_3C_6H_5O_7.H_2O = Na_3C_6H_5O_7 + 4H_2O + 3CO_2$$

$$2NaHCO_3 + H_2C_4H_4O_6 = Na_2C_4H_4O_6 + 2H_2O + 2CO_2$$

From these equations it will be observed that no harmful ingredients are formed by the effervescing action. Moreover, the palatability of the resultant product is greatly improved, and the effervescing qualities also add to its antacid effect. Oil of peppermint or other ingredients of similar nature may be added to change or modify the flavor.

Effervescent milk of magnesia can be prepared in accordance with the present invention in granular, tablet, powdered or other solid form. For example, an effervescent tablet may be made either by (1) compressing the effervescent granules into a tablet, or by (2) admixing with powdered effervescent milk of magnesia a binder such as powdered acacia gum or powdered gum tragacanth and then compressing. In order to prepare a powdered effervescent milk of magnesia, the dehydrated crystals of citric acid are employed instead of the unefforesced crystals.

It will be understood that variations may be made in the proportions of the ingredients within reasonable limits required to obtain effervescence, and other variations will be apparent to those skilled in the art that may be made without departing from the invention.

Having thus described the invention, what I claim as new and desire to secure by Letters Patent of the United States is:

1. A new and improved composition of matter comprising magnesium hydroxide intimately associated with effervescent materials, said materials being adapted to effervesce and disperse the magnesium hydroxide when added to water.

2. A new and improved composition of matter comprising magnesium hydroxide intimately associated with effervescent materials, said materials comprising citric acid and bicarbonate of soda and being adapted to efferverse and disperse the magnesium hydroxide when added to water.

3. A new and improved composition of matter comprising magnesium hydroxide intimately associated with effervescent materials, said materials comprising citric acid, bicarbonate of soda and tartaric acid.

4. As a new product of manufacture effervescent milk of magnesia consisting essentially of about 22 parts of magnesium hydroxide, of about 50 parts of sodium bicarbonate, of about 30 parts of citric acid, and about 10 parts of tartaric acid.

5. A new and improved composition of matter comprising magnesium hydroxide associated with effervescing acidic and basic materials, said acidic and basic materials being present in amounts sufficient to neutralize one another during the effervescent action, whereby the magnesium hydroxide remains substantially in a free state.

ALFRED W. PAULEY.